June 13, 1961    R. W. LANCASTER    2,987,894
AUTOMATIC CONTROL OF ROOM TEMPERATURE REGULATING DEVICES
Filed Feb. 27, 1956    3 Sheets-Sheet 3

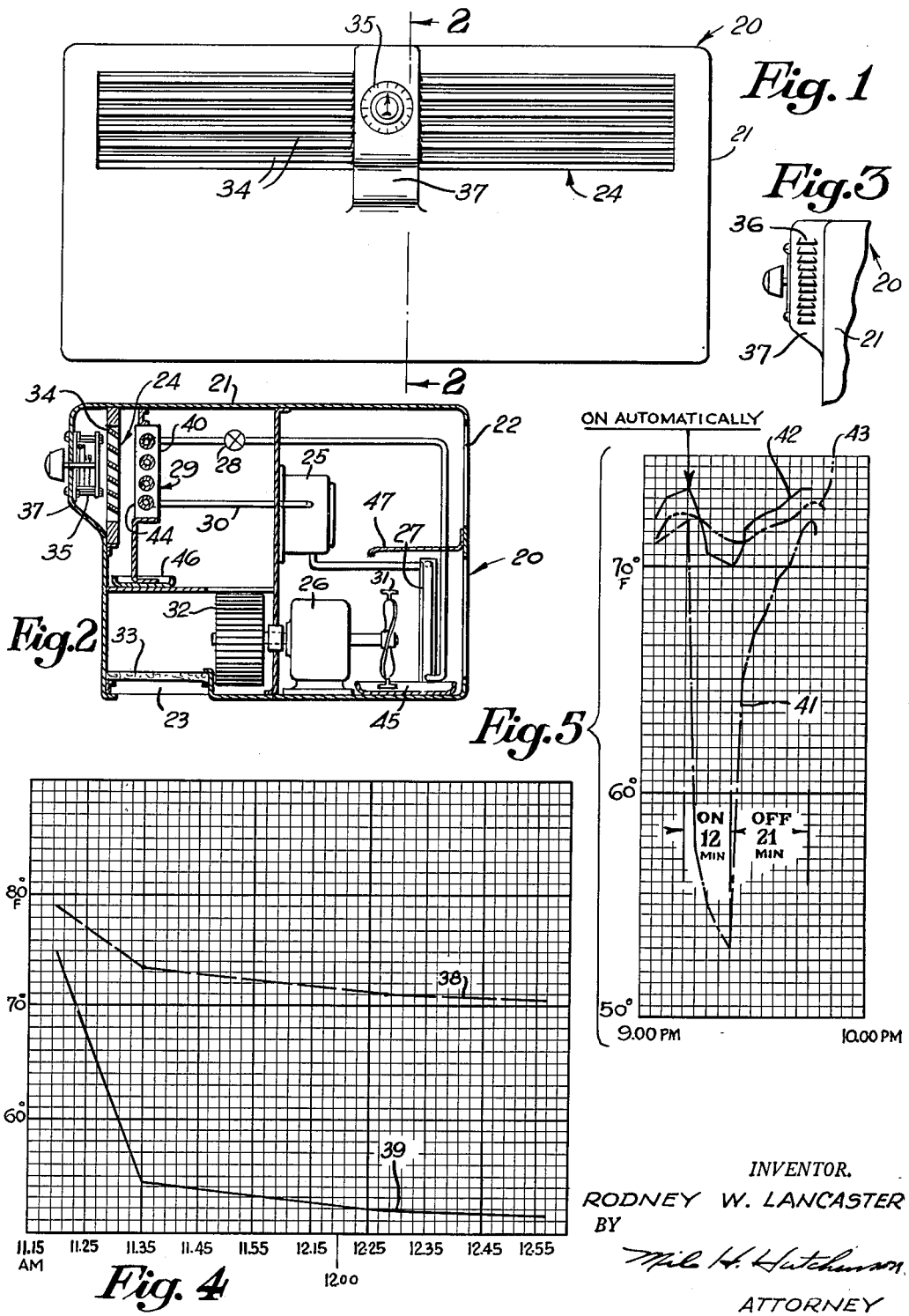

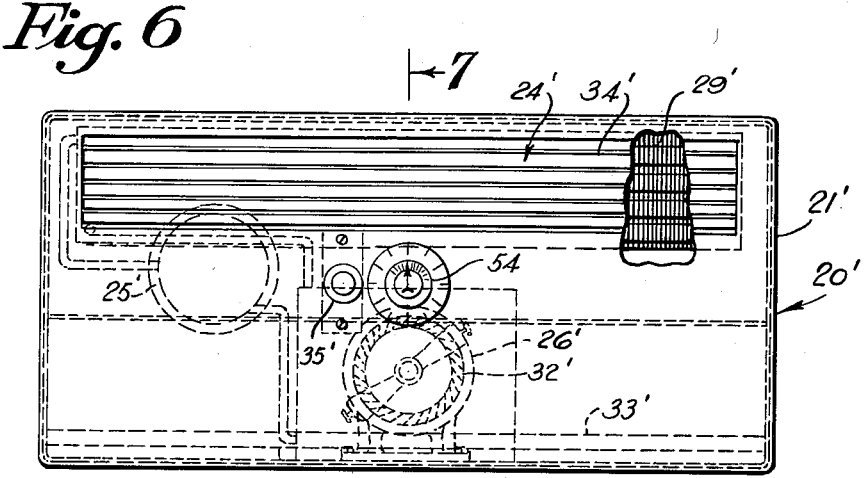
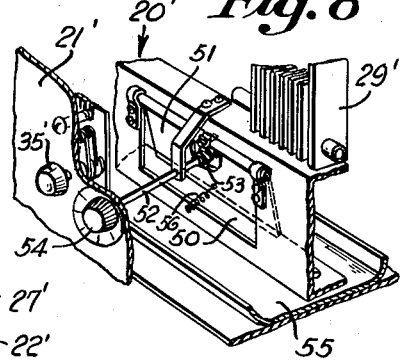
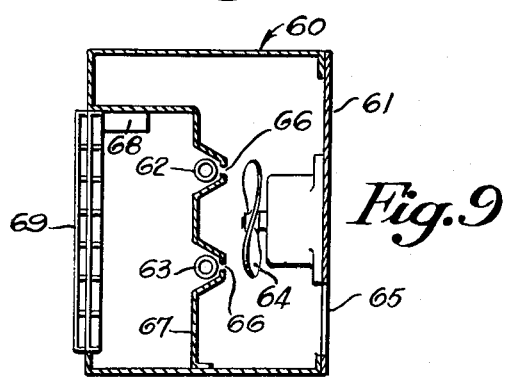
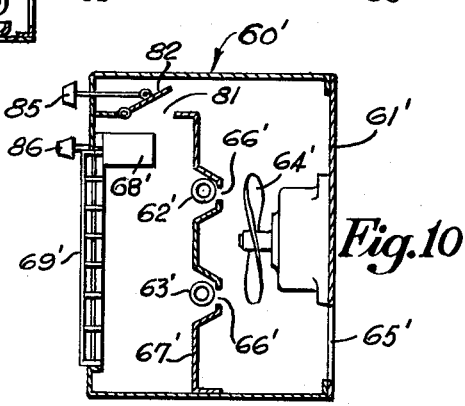

INVENTOR.
RODNEY W. LANCASTER
BY
ATTORNEY 2,987,894
Patented June 13, 1961

2,987,894
AUTOMATIC CONTROL OF ROOM TEMPERATURE REGULATING DEVICES
Rodney W. Lancaster, Red Bank, N.J.
(500 Arlington Road, Camp Hill, Pa.)
Filed Feb. 27, 1956, Ser. No. 568,007
1 Claim. (Cl. 62—97)

This invention relates to improvements in the method and means for the automatic control of the temperature of a fluid in a closure and particularly for the automatic control of room cooling and heating units.

It is an object of the instant invention to utilize a thermal control, such as a thermostat of substantial structure and either large or small differential, to give snap action "makes" and "breaks" and heretofore considered unsuited for use with room cooling and heating units.

Another object is to lower the cost and increase the life of room temperature regulating devices.

An additional object is to prevent the formation of ice on room air cooling units, which now occurs when the filter becomes clogged.

A further object is to provide a cooling unit more responsive to changes in load than possible with known cooling units.

Other objects of the instant invention will become apparent in the course of the following specification.

In the attainment of the aforesaid objectives, subject invention is made in five embodiments, the first three relating to closure or room cooling units and the last two to heating units. Each unit has a casing, and each casing an entrance and exit for the room air. Between the entrance and exit is a cooling or heating thermal exchanger with inlet and outlet and through which the room air passes on its way from the entrance to the exit. Whether a cooling or heating unit, a thermal control, such as a thermostat, in thermal relationship with the room air issuing from the outlet controls the "on" and "off" operation of the unit rather than being posterior of the inlet as now practiced. This is possible because experimentation has shown that every cooling and heating unit has, after initial operation, a substantially constant and wide differential between the temperature of the air at the entrance and the exit.

The invention will appear more clearly from the following detailed description when taken in conjunction with the accompanying drawings showing by way of example five embodiments of the inventive concept.

In the drawings:

FIGURES 1–5 show the first embodiment of the improved automatic control for a temperature regulator constructed in accordance with the principles of this invention and in which:

FIGURE 1 is a front elevational view of an improved room cooling unit with the thermal control in the form of a thermostat located in thermal relationship with the air issuing from the exit of the unit;

FIGURE 2 is a sectional view along the line 2—2 of FIGURE 1;

FIGURE 3 is a side view of the thermostat housing shown in FIGURES 1 and 2;

FIGURE 4 is a chart showing the stabilization of the temperatures of the room air at the entrance and the exit of the unit when it is running without a thermostat in the circuit; and FIGURE 5 is a chart showing a typical cycle when the unit is operating with the thermostat in the circuit and positioned in thermal relationship with the air issuing from the exit as shown in FIGURES 1 and 2.

FIGURES 6–8 show the second embodiment of the improved room cooling unit and in which:

FIGURE 6 is a front elevational view of the cooling unit in part section and similar to the aforementioned first embodiment except that a damper controlled by-pass is provided to subject the thermostat to both the air from the exit and some of the air from the entrance.

FIGURE 7 is a sectional view along the line 7—7 of FIGURE 6; and

FIGURE 8 is an enlarged perspective view of the damper and thermostat shown in FIGURE 7.

FIGURE 9 is a sectional view of the fourth embodiment and differing from the aforementioned first three embodiments in that it is a heating rather than a cooling unit.

FIGURE 10 is a sectional view showing the fifth embodiment and like the previously mentioned fourth embodiment except that a damper controlled bypass is provided to subject the thermostat to both the air issuing from the exit and some of the air from the entrance as in the second embodiment.

Figure 8A:
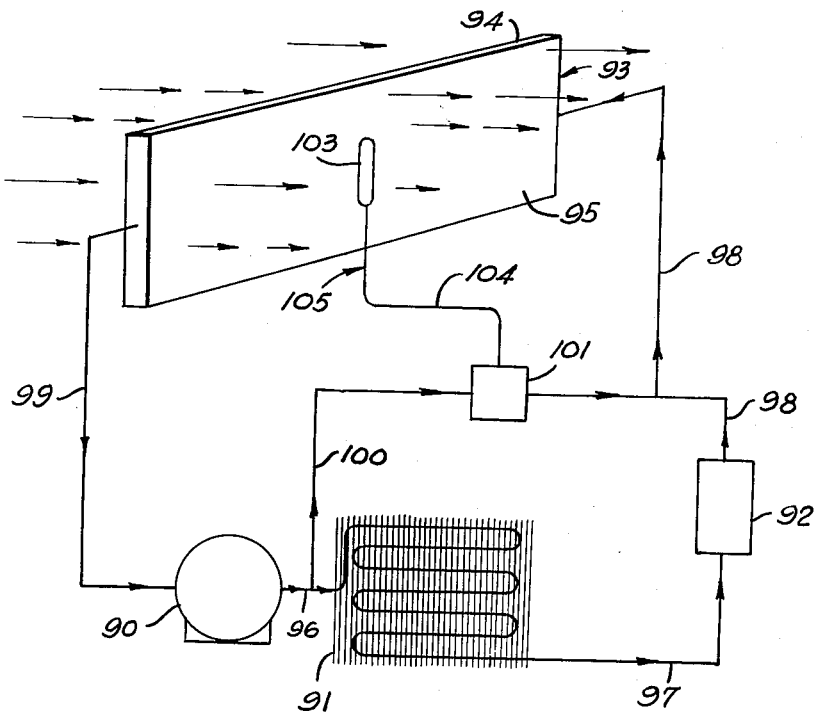
FIGURE 8A is a schematic view of the third embodiment of the room cooling unit and similar to the first embodiment except that a thermal valve is used in lieu of the thermostat.

Referring now in greater detail to the first embodiment, that is the improved room cooling unit shown in FIGURES 1–5, where like reference numerals indicate like parts, reference numeral 20 indicates the cooling unit.

Within the casing 21 is the known cooling apparatus constituted of the compressor 25 actuated by a self-contained motor (not shown) for the compression and forwarding of a refrigerant to the condenser 27, and thence through an expansion valve 28 to the evaporator 29 of substantially constant temperature from which it is returned through a conduit 30 to the compressor 25 for further compression. A fan 31 at one end of the shaft of a motor 26 drives the heat of compression from the condenser 27 through the lower portion of the open back 22 of the casing 21 with the aid of the baffle 47 which partially divides the space to provide an opening at the top for the admission of relatively cool outside air and an opening at the bottom for that air after passing through the condenser 27.

At the opposite end of the shaft of the motor 26 is a squirrel cage fan 32 which draws the air from the room through the room air entrance 23 and the filter 33 and forces it upwardly and through the inlet 40 of the evaporator 29 and thence out the outlet 44 thereof and exit 24, protected by the louvers 34, back into the room. Of course, the volume of air moved by the fan 32 is substantially constant.

Reference numeral 45 indicates a drip pan under the condenser 27 and the fan 31. Reference numeral 46 indicates another drip pan designed to gather the moisture from the evaporator 29. The moisture which is gathered in the drip pan 46 may be piped by any suitable means (not shown) to the pan 45.

The improvement consists in placing a thermal control in the form of a thermostat 35 or the like adjacent the room air exit 24 so that it is in thermal relationship with the air issuing from the air outlet 44. For example, the thermostat 35 may be placed in a housing 37 as shown in FIGURE 3, which is provided with louvers 36 in each side, and the housing attached to the casing 21 in a suitable manner. Of course, the thermostat 35 illustrated may be replaced by a thermal valve actuated by itself or an external expansion member or by the motion of a fluid in an associated tube. In addition, the thermostat 35 may be replaced by a thermal bulb which actuates a mechanical clutch, valve, electrical switch, relay, etc.

Each cooling unit 20 has a readily determined and uniform temperature differential between the air at the entrance 23 and the exit 24, which may be varied by design. Such temperature differential is a substantial amount, for example 12, 15, or 20 degrees F. Because of the magnitude of the differential, the thermostat 35 may be of very sturdy construction while in contrast the known thermostat in thermal relationship with the air at the entrance 23 or posterior thereof must be responsive to very slight changes in room temperature caused by turning on a light, opening a door, or the entry of one or more persons into the room. In the case of air conditioning in automobiles, a thermostat in thermal relationship with the air at the entrance will have its contacts so close together that a sudden jar of the car will close the contacts, causing the unit to cycle to the discomfort of the occupants. Obviously, when a thermostat is limited to very slight variations in room temperature, tolerance becomes a very important consideration. However, with the thermostat 35 in thermal relationship with the air issuing from the room air exit 24, as illustrated, it may be of very sturdy construction with the contacts relatively far apart and without consideration of tolerance as long as the combined temperature range of the thermostat with tolerance is less than the temperature differential of the cooling unit. Of course, the thermostat 35 may be either adjustable or fixed. If adjustable, the operator usually shifts both the opening and closing temperatures which maintain a fairly constant operating differential throughout the adjustable range. On the other hand, the closing temperature of the thermostat may be fixed, for example, at 68 degrees F. with the opening temperature only adjustable, possibly within the range of 50 to 64 degrees F. to obtain the desired temperature for the room or closure.

The substantially constant temperature differential between the temperature of the room air at the entrance 23 and the exit 24 is shown graphically in FIGURE 4. With the compressor motor (not shown) running without a thermostat or other thermal control in the circuit, the temperature of the room air at the entrance 23 followed the line 38 while the temperature of the air at the exit 24 followed the substantially parallel line 39 and with the outside temperature rising.

Placing the thermostat 35 in thermal relationship with the air issuing from the exit, and connecting it in the circuit of the compressor motor (not shown) and a source of electrical energy produced a series of cycles one of which is shown graphically in FIGURE 5 where the line 41 indicates the temperature of the room air at the exit 44, 42 the temperature of the room air at the entrance 23, and 43 the temperature in the room. The cycle shows an "on" period of around 12 minutes and an "off" period of some 21 minutes. Running this unit with a three-quarters H.P. motor over a period of approximately six hours resulted in a relatively even room temperature of 70.5 to 73.0 degrees F. while the temperature outside of the room changed 10 degrees F. The thermostat 35 could be placed in the circuit of the motor 26 or in the circuit of both the motor 26 and the compressor motor for intermittent operation.

The cooling unit 20 is usually equipped with a damper (not shown) for admitting fresh air into the closure or room. Subject invention with the thermostat in thermal relationship with the air at the exit 24 will immediately sense the change in the load placed on the unit when the fresh air damper is opened or closed, which is impossible when the thermostat is in thermal relationship with the room air at the entrance 23.

Referring now to the second embodiment of the improved cooling unit shown in FIGURES 6–8, reference numeral 20' indicates the cooling unit.

The cooling unit 20' is similar to that of the previously described first embodiment in that it is constituted of a casing 21' with substantially open back 22', room air entrance 23', and room air exit 24', the unit being designed for insertion in any known opening in a closure or room (not shown). Within the casing 21' is the known cooling apparatus constituted of the compressor 25' with self-contained motor (not shown) for the compression and forwarding of a refrigerant to the condenser 27', thence through an expansion valve 28' to an evaporator 29' from which it is returned through a conduit 30' to the compressor 25' for further compression. A fan 31' at one end of the shaft of a motor 26' drives the heat of compression from the condenser 27' through the lower portion of the open back 22' which is partially divided into an upper and lower portion by the baffle 47'. At the opposite end of the shaft of the motor 26' is a squirrel cage fan 32' which draws the air from the room through the room air entrance 23' and the filter 33' and forces it upwardly and through the inlet 40' of the evaporator 29' and out the outlet 44' thereof, and thence out the exit 24' which is protected by the louvers 34'.

The cooling unit 20' differs from that of the previously described first embodiment in that a by-pass 50 is provided in the casing 21' for some of the room air drawn through the entrance 23'. In the by-pass 50 is an adjustable damper 51 operated by a shaft 52 through the worm gear 53 or the like and aided by the spring 56. A knob 54 fixed to one end of the shaft 52 and suitably calibrated opens and closes the damper 51 to regulate the amount of room air that passes directly over the thermostat 35' without first passing through the evaporator 29'. Thus, the thermostat 35' may be subjected to both the cool air from the evaporator 29' as well as to some of the relatively warm air from the room which flows through the by-pass 50 when the damper 51 is in the open position as illustrated. In this manner, the room temperature may be regulated by the damper or the thermostat or both.

The thermostat 35' may be of the fixed type having large or small differential or, in lieu of the thermostat, any device may be used which is capable of sensing temperature changes and to either, directly or indirectly, regulate the amount of cooling.

Obviously, moisture will gather on the damper 51 so that a drip pan 55 may be used to gather the condensate from both the damper 51 and evaporator 29' which then may be piped by any known means (not shown) to another pan 46' designed to gather moisture from the condenser 27' and the fan 31'.

The third embodiment of the cooling unit shown schematically in FIGURE 8A is substantially similar to the previously described cooling unit of the first embodiment.

The known components of the cooling unit of the third embodiment are the compressor 90 with self-contained but not illustrated motor, the condenser 91, the dryer 92, and the evaporator 93. Of course, there is a casing (not shown) and a motor driven fan, as in the first embodiment, for drawing the room air through an entrance in the casing, thence through a filter, the air then being directed through the inlet 94 of the evaporator 93, and thence out the outlet 95 thereof back into the room. Furthermore, another fan (not shown) driven by the previously mentioned motor is used to cool the condenser in the usual manner. A refrigerant is compressed and driven by the compressor 90 through the conduit 96, thence through the condenser 91 and the conduit 97 to the dryer 92, thence through the conduit 98 to one end of the evaporator 93 and out the opposite end thereof and the conduit 99 for recompression in the compressor 90. A conduit 100 interconnects the conduit 96 to one side of the shut off valve 101 while the opposite side thereof is interconnected with the conduit 98 to form a by-pass for the refrigerant around the condenser 91 and the dryer 92 when the shut off valve 101 is in the open position, the shut off valve being operated by the expansion and contraction of a fluid in the sensing portion 103 and the tube 104 of the thermal valve 105.

The improvement consists in placing the sensing portion 103 of the thermal valve 105 in thermal relationship with the air issuing from the outlet 95 of the evaporator 93.

As in the second embodiment, a damper controlled by-pass for some the room air around the evaporator 93 and interconnecting with the casing exit (not shown) could be provided to lead some of the room air directly to the sensing portion 103 without first passing through the evaporator.

Referring now to the fourth embodiment of the room temperature control device shown in FIGURE 9, reference numeral 60 indicates a heating unit.

The heating unit 60 is constituted of the following known components: A casing 61 within which are the heating elements 62 and 63, a fan 64 for drawing room air through the entrance 65 in the back of the casing 61 and forcing it upwardly and through the openings 66 in the reflector 67, and thence around the heating elements 62 and 63 back into the room.

The improvement consists in placing a thermostat 68, either fixed or adjustable, of sturdy construction and of any reasonably large or small differential adjacent the room air exit 69 so that it is in thermal relationship with the air issuing therefrom, and connecting the thermostat in the well known circuit (not shown) of the heating elements and fan or the heating elements alone when the fan is in a separate circuit, and a source of electrical energy.

The following table shows how the temperature of the room air at the entrance 65 and the exit 69, with no thermal control in the circuit and after a brief period, stabilized and produced a substantially constant temperature differential of around 54 degrees F. over a period of many hours:

| Time | Temperature in degrees F. | | |
|---|---|---|---|
| | Room | Room at entrance 65 | Room at exit 69 |
| p.m. | | | |
| 10:14 | 72.50 | 74.00 | 72.50 |
| 10:20 | 72.75 | 74.50 | 112.00 |
| 10:22 | 73.50 | 76.50 | 126.00 |
| 10:25 | 74.50 | 77.50 | 134.00 |
| 11:03 | 78.00 | 80.00 | 134.00 |
| a.m. | | | |
| 2:00 | 78.00 | 80.00 | 134.00 |
| 9:35 | 77.50 | 80.00 | 134.00 |

Referring now to the fifth embodiment of the room temperature control device shown in FIGURE 10, reference numeral 60' indicates a heating unit, 64' the fan, 66' the openings in the reflector 67', and 69' the outlet.

The heating unit 60' is similar to the previously described heating unit 60 except that a by-pass 81 is provided in the casing 61' for diverting some of the room air from the entrance 65' around the thermostat 68' without first passing around the heating elements 62' and 63'. As in the second embodiment, the by-pass 81 is equipped with an adjustable damper 82 for controlling the magnitude thereof while the thermostat 68' is located at a point where it will be in thermal relationship with the warm air issuing from around the heating elements 62' and 63' as well as to some of the relatively cooler air from the entrance 65' when the damper is in the open position as illustrated.

The thermostat 68', either fixed or adjustable, may be of substantial structure with the contact points reasonably spaced apart and with either large or small differential. If the thermostat 68' be fixed, then a knob 85 suitably calibrated for room temperature ranges may be provided for the shaft of the adjustable damper, the shaft operating the damper by a cam, the worm gear shown in the second embodiment or any other suitable means.

If the thermostat be of the adjustable type, then the knob 86 may be calibrated for a definite position of the damper 82 or vice versa.

In each embodiment, there may be one or more "on" and "off" switches in the well known circuits not shown in the drawings and the thermostat knob calibrated with the indicia "Low," "Medium," and "High" or the like in the usual manner.

The operation of the previously described embodiments will be clear from the foregoing. In the case of a stationary radiator, the principles of this invention are equally applicable. For example, merely by enclosing a stationary radiator so as to provide a room air entrance and exit, a thermostat in thermal relationship with the air issuing from the exit or forced to issue therefrom will operate with the same efficiency. Also, a convector type radiator having an entrance and exit for the room air can be adapted to the principles of this invention. For example, a thermostat or thermal valve or the like in thermal relationship with the air issuing from the exit and operably connected with the known solenoid controlled valves will pass or by-pass a temperature regulating fluid through or around the radiator in accordance with the setting of the thermal control.

It will be obvious that another fluid than air may be used and that a closure other than a room may be utilized. It will be further obvious that the thermal exchanger may be either the evaporator of the cooling unit or the heating element of the heating unit. Cases arise where the room air only is electrically circulated while the thermal exchanger is other than electrically operated. Moreover, there are cases where the thermal exchanger is electrically operated while the circulation of the air is by other than electrical means. Likewise there are cases, as illustrated and described, where both the circulation of the air and the operation of the thermal exchanger is by electrical means. Hence, it will be understood that various changes may be made in details within the scope of the appended claim without departing from the spirit of the invention.

What is claimed is:

A method for automatically controlling the temperature of a fluid in an enclosure which comprises circulating the fluid through a thermal exchanger, sensing the temperature of the circulated fluid by single thermal responsive means of wide differential adjacent the exchanger, and controlling the temperature of the thermal exchanger by diverting some of the fluid from the enclosure directly to the single thermal responsive means of wide differential without passing the fluid through the thermal exchanger.

References Cited in the file of this patent
UNITED STATES PATENTS

| | | | |
|---|---|---|---|
| 1,022,188 | Gessinger | Apr. 2, | 1912 |
| 1,788,515 | Gannon | Jan. 13, | 1931 |
| 1,862,657 | Breidenthal | June 14, | 1932 |
| 1,888,242 | Sholtes | Nov. 22, | 1932 |
| 2,123,352 | Blanchard | July 12, | 1938 |
| 2,130,089 | Hull | Sept. 13, | 1938 |
| 2,146,483 | Philipp | Feb. 7, | 1939 |
| 2,165,831 | Aulsebrook | July 11, | 1939 |
| 2,304,999 | Gonzalez | Dec. 15, | 1942 |
| 2,340,292 | Aspelin | Feb. 1, | 1944 |
| 2,344,215 | Soling | Mar. 14, | 1944 |
| 2,351,096 | Blue | June 13, | 1944 |
| 2,423,382 | Graham | July 1, | 1947 |
| 2,438,120 | Freygang | Mar. 13, | 1948 |
| 2,473,589 | Johnson | June 21, | 1949 |
| 2,511,419 | Smith | June 13, | 1950 |
| 2,524,568 | Kritzer | Oct. 3, | 1950 |
| 2,632,315 | Coblentz | Mar. 24, | 1953 |
| 2,741,098 | Janos | Apr. 10, | 1956 |
| 2,756,568 | Jordan | July 31, | 1956 |
| 2,774,219 | Kelley | Dec. 18, | 1956 |
| 2,774,220 | Heym | Dec. 18, | 1956 |

FOREIGN PATENTS

| | | | |
|---|---|---|---|
| 240,296 | Switzerland | May 1, | 1946 |